(12) United States Patent
Collie et al.

(10) Patent No.: US 9,631,630 B2
(45) Date of Patent: Apr. 25, 2017

(54) BEARING CARRIER FOR A PUMP

(75) Inventors: Clive Frederick Collie, Elstree (GB); Alan Ernest Kinnaird Holbrook, Pulborough (GB); David Bedwell, Bexhill-on-Sea (GB)

(73) Assignee: Edwards Limited, Crawley (GB)

( * ) Notice: Subject to any disclaimer, the term of this patent is extended or adjusted under 35 U.S.C. 154(b) by 1071 days.

(21) Appl. No.: 13/805,572

(22) PCT Filed: May 19, 2011

(86) PCT No.: PCT/GB2011/050947
§ 371 (c)(1),
(2), (4) Date: Dec. 19, 2012

(87) PCT Pub. No.: WO2012/004579
PCT Pub. Date: Jan. 12, 2012

(65) Prior Publication Data
US 2013/0089419 A1     Apr. 11, 2013

(30) Foreign Application Priority Data
Jul. 8, 2010     (GB) .................................. 1011524.4

(51) Int. Cl.
*F04D 29/046*     (2006.01)
*F01C 21/00*     (2006.01)
(Continued)

(52) U.S. Cl.
CPC .......... *F04D 29/046* (2013.01); *F01C 21/003* (2013.01); *F01C 21/02* (2013.01);
(Continued)

(58) Field of Classification Search
CPC ............................. F04D 19/042; F04D 29/046
See application file for complete search history.

(56) References Cited

U.S. PATENT DOCUMENTS

| 2,521,638 A |   | 9/1950 | Lamm |
|---|---|---|---|
| 3,759,626 A | * | 9/1973 | Becker .................. F04D 19/042 384/535 |

(Continued)

FOREIGN PATENT DOCUMENTS

| EP | 2088327 A1 | 8/2009 |
|---|---|---|
| FR | 2369059 A1 | 5/1978 |

(Continued)

OTHER PUBLICATIONS

Translation of the Second Office Action, from counterpart Chinese Patent Application No. 201180033805.0, dated Sep. 21, 2015, 6 pp.

(Continued)

*Primary Examiner* — Craig Kim
*Assistant Examiner* — Eldon Brockman
(74) *Attorney, Agent, or Firm* — Shumaker & Sieffert, P.A.

(57) ABSTRACT

The present invention relates to a pump (10) comprising a shaft (15) supported for rotation by a bearing (38) carried by a bearing carrier (48), said bearing carrier having a generally outer radial portion (52) which is fixed relative to a pump housing (12) and a generally inner radial portion (54) which is fixed relative to the bearing, wherein the carrier is stiff in a radial direction between said inner and outer portions and flexible in an axial direction for restraining radial movement of the bearing and allowing axial movement.

5 Claims, 6 Drawing Sheets

(51) Int. Cl.
*F01C 21/02* (2006.01)
*F04C 18/02* (2006.01)
*F16C 25/08* (2006.01)

(52) U.S. Cl.
CPC ........ *F04C 18/0215* (2013.01); *F16C 25/083* (2013.01); *F04C 2240/50* (2013.01)

(56) References Cited

U.S. PATENT DOCUMENTS

| | | | |
|---|---|---|---|
| 4,963,041 A | 10/1990 | Sowards | |
| 5,281,115 A | 1/1994 | Timuska | |
| 7,121,817 B2* | 10/2006 | Yanagisawa | F01C 1/0223 418/101 |
| 8,360,754 B2* | 1/2013 | Crisi | F04D 19/042 417/423.4 |
| 2006/0216181 A1 | 9/2006 | Yanagisawa et al. | |
| 2009/0208354 A1 | 8/2009 | Crisi et al. | |

FOREIGN PATENT DOCUMENTS

| | | | |
|---|---|---|---|
| GB | 1331166 A | | 9/1973 |
| JP | H08232873 A | | 9/1996 |
| JP | 2003-343203 | | 12/2003 |
| WO | 0183993 A1 | | 11/2001 |
| WO | 2010097959 A1 | | 9/2010 |

OTHER PUBLICATIONS

Translation of the Office Action, from counterpart Taiwan Patent Application No. 100118351, dated Oct. 21, 2015, 3 pp.
Translation of the Office Action, from counterpart Japanese Patent Application No. 2013-517523, dated Apr. 30, 2015, 2 pp.
English Translation of the First Office Action and Search Report from counterpart Chinese Patent Application No. 201180033805.0, dated Dec. 25, 2014, 11 pp.
Office Action and translation thereof, from counterpart Taiwan Application No. 100118351, dated Apr. 14, 2016, 7 pp.
Translation of the Office Action of the Intellectual Property Office of Korea for corresponding Patent Application No. 2013-7000364 dated Nov. 2, 2016, 7 pgs.
Communication pursuant to Article 94(3) EPC mailed Jan. 27, 2017 in EP counterpart application 11721820.6, 5 pp.

* cited by examiner

BEARING CARRIER FOR A PUMP

The invention relates a pump and particularly, but not exclusively, a scroll pump and the bearing carrier thereof. The invention might also find other applications, such as electric motors for example.

A scroll pump comprises a fixed scroll and an orbiting scroll. The orbiting scroll is driven by an eccentric shaft portion of a drive shaft to orbit relative to the fixed scroll. The drive shaft is rotated by a motor. Rotation of the drive shaft, imparts an orbiting motion to the orbiting scroll relative to the fixed scroll to pump fluid from an inlet to an outlet of the scroll arrangement.

Figure 6:
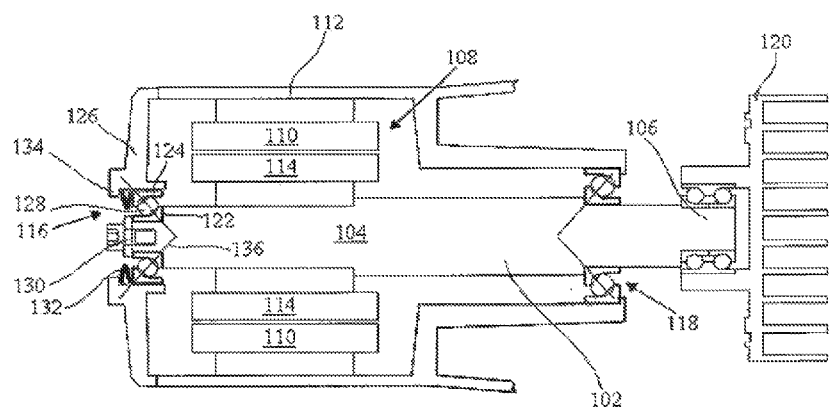

Part of a prior art scroll pump is shown in more detail in FIG. 6. The fixed scroll is not shown for simplicity. The pump comprises a drive shaft 102 having a concentric shaft portion 104 and an eccentric shaft portion 106. The shaft is driven by a motor 108 having a first part 110 fixed relative to the pump housing 112 and a second part 114 fixed relative to the concentric shaft portion.

The concentric shaft portion 104 is supported for rotation by a first bearing 116 and a second bearing 118. The second bearing 118 supports the orbiting scroll 120 relative to the eccentric shaft portion to allow relative angular movement so that on rotation of the shaft orbiting motion is imparted to the orbiting scroll.

The first bearing 116 has an inner race 122 fixed relative to the shaft 102 and an outer race 124 which is located against a bearing carrier 126. The bearing carrier may form part of the housing or is fixed relative to the housing. A number of balls 128 allow rotation of the shaft relative to the bearing carrier.

A fastening member 130 fastens the inner race 122 in position against a radially extending shoulder of the concentric shaft portion so that the inner race is fixed relative to the drive shaft in both the radial and axial directions. The outer race is able to slide in the axial direction relative to the bearing carrier 126 to allow expansion and contraction of the shaft in the axial direction, for example due to heat. This sliding motion also enables the mechanism to accommodate variation in axial part dimensions that result from the part tolerances. A spring member 132 is located between a radially inwardly directed lip 134 of the bearing carrier and the outer race, and biases the outer race and the shaft in the axial direction (towards the right in FIG. 6). The force generated by this preloaded system is shown by lines 136 and provides a resistance to axial movement of the shaft to reduce the amount of back and forwards movement. Similar but complementary forces are generated in the second bearing 118. The bearing carrier 126 is a fixed member and therefore prevents radial movement. Axial and radial movement of the shaft should be restricted because the axial and radial clearances between the orbiting scroll 120 and a fixed scroll are required to be small for efficient pumping, particularly if the scroll arrangement is not lubricated.

However, axial and radial loading on the first bearing 116 and bearing carrier 126 causes damage typically by fretting, requiring bearing replacement at regular intervals, which increases the cost of ownership.

The present invention provides an improved bearing assembly for a pump.

The present invention provides a pump comprising a shaft supported for rotation by a bearing carried by a bearing carrier, said bearing carrier having a generally outer radial portion which is fixed relative to a pump housing and a generally inner radial portion which is fixed relative to the bearing, wherein the carrier is stiff in a radial direction between said inner and outer portions and flexible in an axial direction for restraining radial movement of the bearing and allowing axial movement.

Figure 1:
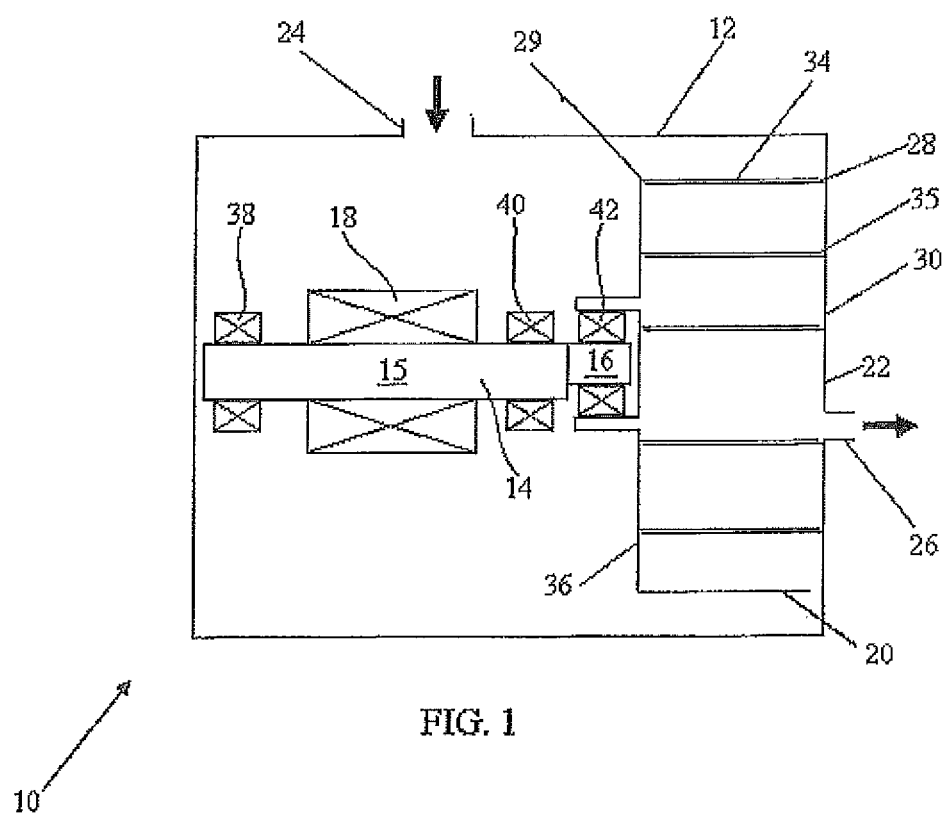
Figure 2:
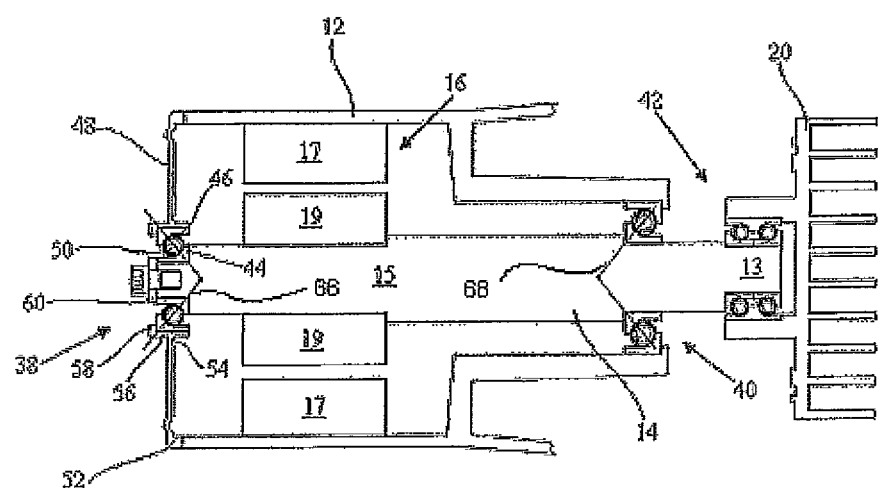
Figure 3:
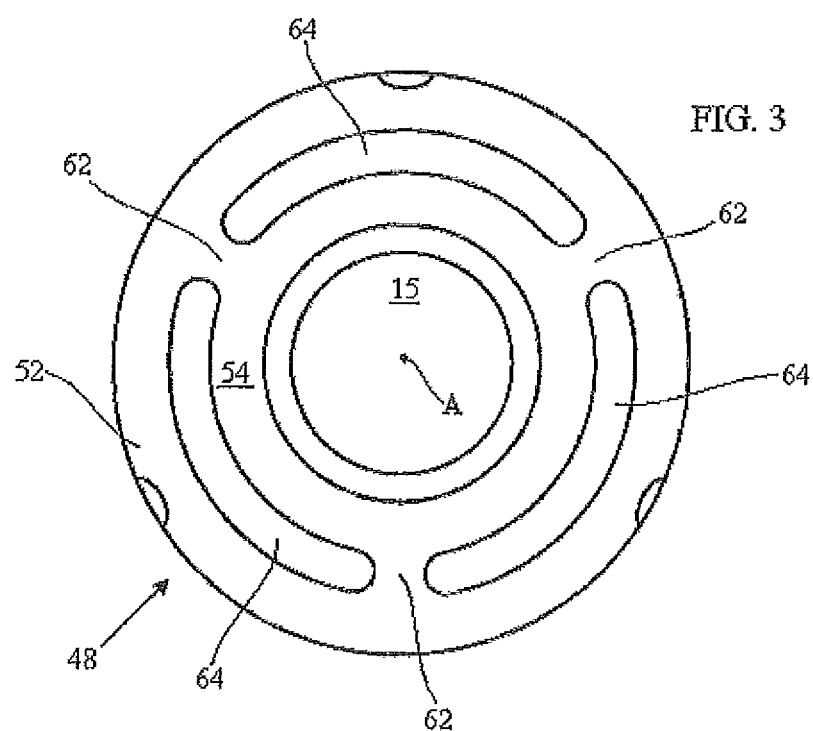
Figure 4:
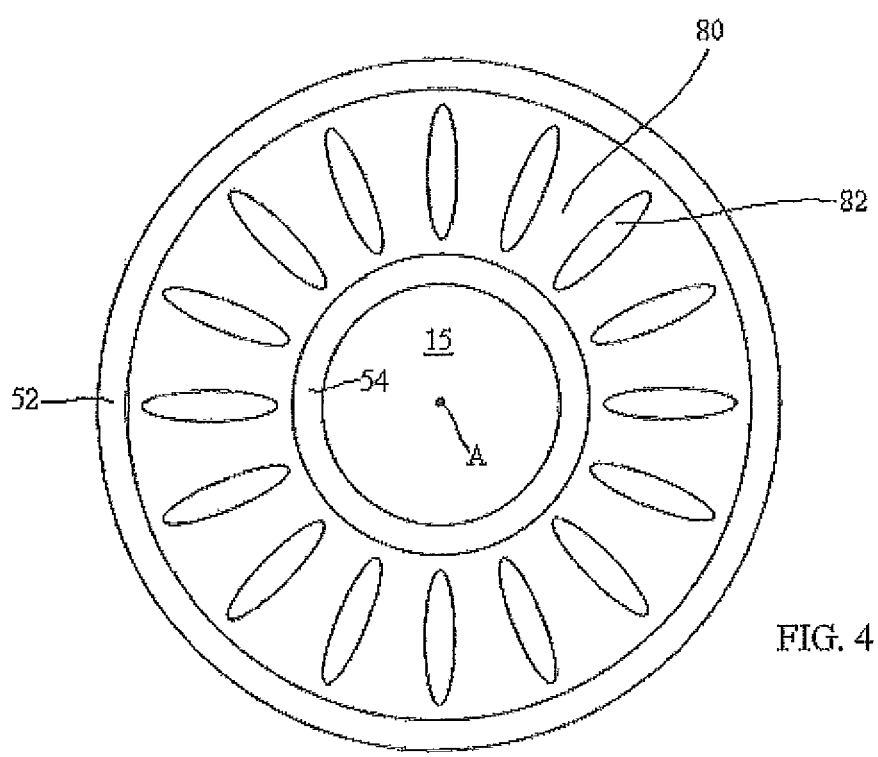
Figure 5:
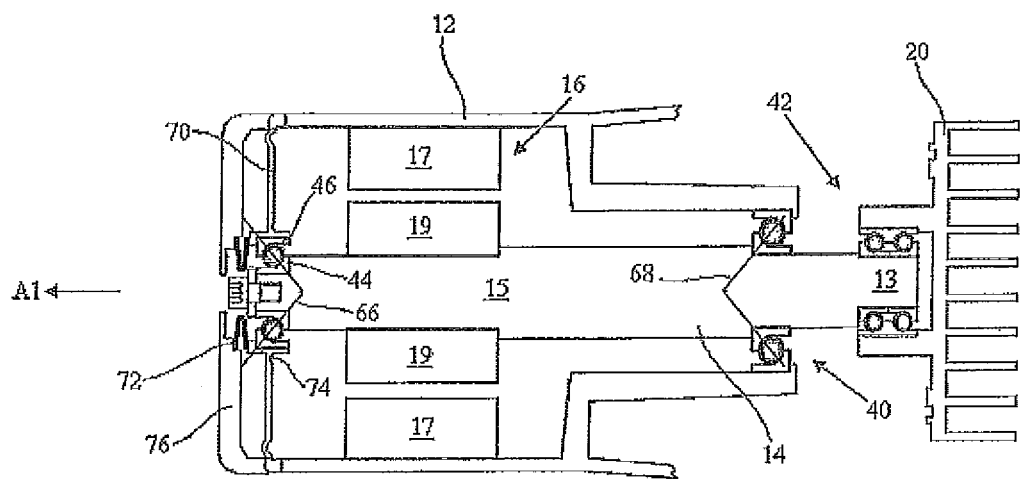

In order that the invention may be well understood, some embodiments thereof, which are given by way of example only, will now be described with reference to the drawings in which:

FIG. 1 is a schematic representation of a scroll pump;
FIG. 2 shows in more detail part of the scroll pump of FIG. 1;
FIG. 3 shows a bearing carrier of the FIG. 1 scroll pump;
FIG. 4 shows an alternative bearing carrier;
FIG. 5 shows part of another scroll pump; and
FIG. 6 shows part of a prior art scroll pump.

A scroll compressor, or pump, 10 is shown in FIG. 1. The pump 10 comprises a pump housing 12 and a drive shaft 14 having a concentric shaft portion 15 and an eccentric shaft portion 16. The shaft 14 is driven by a motor 18 and the eccentric shaft portion is connected to an orbiting scroll 20 so that during use rotation of the shaft imparts an orbiting motion to the orbiting scroll relative to a fixed scroll 22 for pumping fluid along a fluid flow path between a pump inlet 24 and pump outlet 26 of the compressor.

The fixed scroll 22 comprises a scroll wall 28 which extends perpendicularly to a generally circular base plate 30 and has an axial end face, or surface, 29. The orbiting scroll 20 comprises a scroll wall 34 which extends perpendicularly to a generally circular base plate 36 and has an axial end face, or surface, 35. The orbiting scroll wall 34 co-operates, or meshes, with the fixed scroll wall 28 during orbiting movement of the orbiting scroll. Relative orbital movement of the scrolls causes a volume of gas to be trapped between the scrolls and pumped from the inlet to the outlet.

A scroll pump may be a dry pump and not lubricated. Particularly when not lubricated, in order to prevent back leakage, the axial and radial clearances between the scrolls must be accurately maintained. The space between the axial ends 29, 35 of a scroll wall of one scroll and the base plate 30, 36 of the other scroll is sealed by a sealing arrangement, which generally comprises tip seals.

The pump increases in temperature during use, however, not all components within the pump increase at the same rate, and also due to different coefficients of thermal expansion, the shaft 14 responds to changes in temperature to a greater extent than the pump housing 12. Accordingly, first and second bearings 38, 40 of the concentric shaft portion must accommodate expansion and contraction of the shaft, without affecting the axial and radial clearances between the orbiting and fixed scrolls. Further, first and second bearings 38, 40 preferably accommodate shafts of different lengths within a range of lengths produced within manufacturing tolerances.

The bearing arrangement will be described in more detail with reference to FIGS. 2 and 3. The fixed scroll 22 is not shown in FIG. 2 for simplicity.

As shown in FIG. 2, the drive shaft 14 has a concentric shaft portion 15 and an eccentric shaft portion 13. The shaft is driven by a motor 16 having a first part 17 fixed relative to the pump housing 12 and a second part 19 fixed relative to the concentric shaft portion 15. The second part 19 is free to move to a certain extent in the axial direction relative to first part 17.

The concentric shaft portion 15 is supported for rotation by first bearing 38 and second bearing 40. The third bearing 42 supports the orbiting scroll 20 relative to the eccentric shaft portion to allow relative angular movement so that on rotation of the shaft orbiting motion is imparted to the orbiting scroll.

The first bearing 38 has an inner race 44 fixed relative to the shaft 14 and an outer race 46 which is fixed to a bearing carrier 48. A number of balls 50 allow rotation of the shaft 14 relative to the bearing carrier 48. The bearing carrier 48 has a radial outer portion 52 which is fixed relative to the housing 12 and a radial inner portion 54 which is fixed to the outer race 46 of the first bearing 38. The radial inner portion in this example comprises an annular seat 56 having a radially extending lip 58 for fixing to the outer race 46 so that the outer race is carried by the radial inner portion 54. The inner race 44 is fixed to the shaft between a fastening member 60 and a shoulder of the shaft.

The bearing carrier 48, which is shown in more detail in FIG. 3, is configured to restrain radial movement of the bearing 38 but allow axial movement. The bearing carrier has in this example a middle portion comprising three generally flexible support portions 62 located between openings 64 through the carrier which allow the carrier to flex along axis A of shaft portion 15. The support portions are however stiff in the radial direction to restrain radial movement of the shaft which would otherwise cause misalignment of the orbiting and fixed scrolls. As the inner portion 54 of the carrier is fixed relative to the outer race 46 of the bearing 38 (not shown in FIG. 3), the bearing is not required to slide relative to the carrier as is the case with the prior art arrangement shown in FIG. 6, and therefore the bearing 38 suffers from less damage and requires replacement at longer intervals.

An alternative bearing carrier 78 is shown in FIG. 4. In this arrangement, the middle portion forms a spoke structure comprising a multiplicity of flexible support portions 80 each located between adjacent openings 82 through the carrier which allow the carrier to flex along axis A of shaft portion 15. The support portions are however stiff in the radial direction to restrain radial movement of the shaft which would otherwise cause misalignment of the orbiting and fixed scrolls. The provision of a large number of support portions (16 as shown) distributes the radial loading on the bearing carrier about its circumference.

In the FIG. 2 arrangement, the bearing carrier is internally biased to act on the bearing 38 in the direction indicated by lines 66 thereby resisting against axial movement of the bearing 38 in axial direction A1. In this way, thermal expansion of the shaft is permitted but forces indicated by lines 68 are maintained at the second bearing 40 so that axial spacing between the orbiting scroll and fixed scroll is kept generally constant. The bearing carrier 48 may be manufactured for example from aluminium or steel but not limited to these materials and pre-loaded so that when fitted in place exerts the required force on bearing 38.

In another arrangement shown in FIG. 5, a bearing carrier 70 is externally biased to keep axial spacing between the scrolls generally constant. In this regard, a biasing means, which may be a Belleville spring 72 as shown or other suitable spring, is located between an inner portion 74 of the bearing carrier and a fixed housing portion 76 for preloading the bearing carrier 70. The axial stiffness of the bearing carrier is substantially less than the biasing means and delivers a very small pre-load or no pre-load.

It will be understood that the bearing carrier arrangement as described herein may also find use in other devices, comprising shafts supported for rotation by bearing arrangements, with similar axial and radial movement requirements to those of vacuum pumps.

The invention claimed is:

1. A scroll pump comprising:
  a housing;
  a fixed scroll and an orbiting scroll;
  a bearing carrier;
  a bearing carried by the bearing carrier;
  a shaft supported for rotation by the bearing, wherein the bearing carrier comprises a generally outer radial portion which is fixed relative to the pump housing and a generally inner radial portion which is fixed relative to the bearing, and wherein the bearing carrier is stiff in a radial direction between the generally inner radial portion and the generally outer radial portion and flexible in an axial direction for restraining radial movement of the bearing and allowing axial movement of the bearing, wherein the bearing carrier is internally biased to provide an axial force on the bearing in a first axial direction for resisting axial movement of the bearing in a second axial direction; and
  a spring located between the housing and one of the inner portion of the bearing carrier or the bearing for providing the axial force.

2. The pump of claim 1, wherein the bearing carrier further comprises a middle portion between the generally inner radial portion and the generally outer radial portion, and wherein the middle portion is stiff in the radial direction and flexible in the axial direction.

3. The pump of claim 2, wherein the middle portion comprises a plurality of generally radially extending support portions spaced apart by openings through the bearing carrier.

4. The pump of claim 1, wherein the shaft comprises an eccentric shaft portion and a concentric shaft portion, wherein the orbiting scroll is connected to the eccentric shaft portion, and wherein rotation of the shaft imparts an orbiting motion to the orbiting scroll relative to the fixed scroll.

5. The pump of claim 1, wherein the orbiting scroll is connected to the shaft and rotates upon rotation of the shaft, and wherein the axial force is configured to keep an axial spacing between the orbiting scroll and the fixed scroll generally constant.

* * * * *